J. H. SLATER.
TOY.
APPLICATION FILED MAY 7, 1912.
1,051,022.
Patented Jan. 21, 1913.
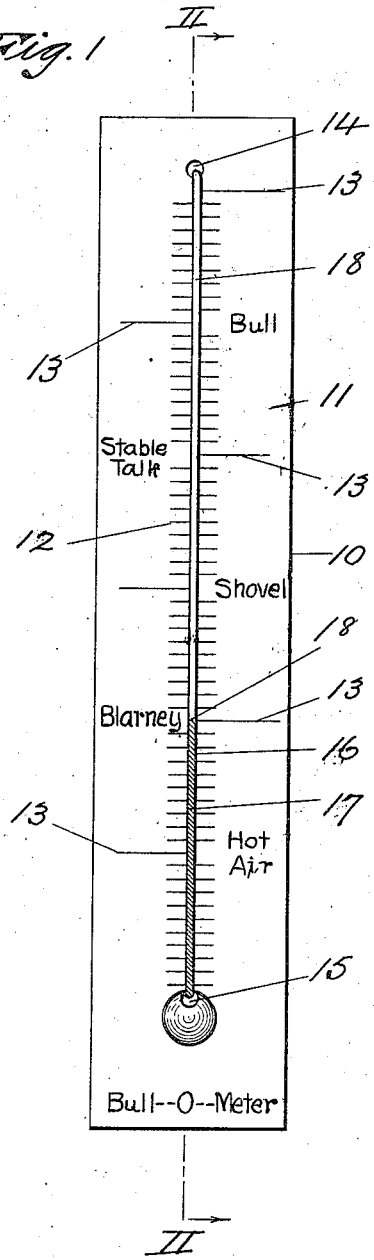
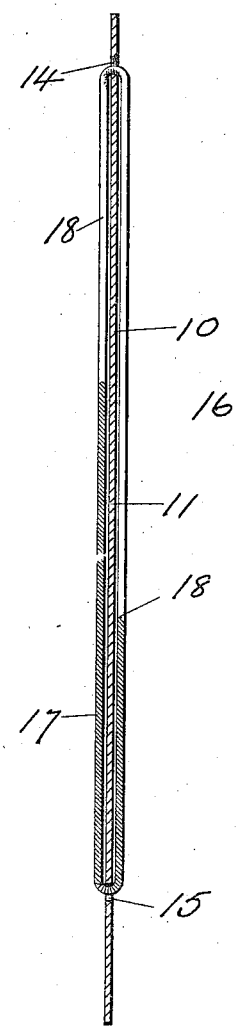
Witnesses:
Charles C. Abbe
M. Dermody
Inventor
Joseph H. Slater
By his Attorney
W. T. Criswell

UNITED STATES PATENT OFFICE.

JOSEPH H. SLATER, OF NEW YORK, N. Y.

TOY.

1,051,022.  Specification of Letters Patent.  Patented Jan. 21, 1913.

Application filed May 7, 1912. Serial No. 695,764.

*To all whom it may concern:*

Be it known that I, JOSEPH H. SLATER, a citizen of the United States, and a resident of New York, borough of Brooklyn, county of Kings, and State of New York, have invented a certain new and useful Improvement in Toys, of which the following is a full, clear, and exact specification.

This invention relates to a class of devices adapted to be used for amusement purposes.

My invention has for its object primarily to provide a toy or device designed to be employed to afford amusement on occasions where a person is engaged in making exaggerated statements, and it is desired to make known in a joking manner to the person or to the hearers that the remarks are considered to be a departure from actual facts.

Another object of the invention is to provide a form of toy on which may be indicated the various phases of absurdity in which the exaggerations are regarded by the hearers of the person making the statements, and a further object of the invention is to provide a device of inexpensive form and which may be made in various sizes of either plain or ornamental designs.

A practical embodiment of the invention is represented in the accompanying drawing forming a part of this specification in which similar characters of reference indicate corresponding parts in all the views, the said invention being more fully described hereinafter and then pointed out in the appended claims.

In the drawing, Figure 1 is a front elevation of one form of toy embodying my invention, and Fig. 2 is a section taken on the line II—II of Fig. 1.

The toy or device 10 has an elongated plate 11 which may be of any suitable shape in plain or ornamental design, and made of any preferred material. On one face of the plate 11 is a scale 12 which is indicated by a plurality of parallel spaced lines disposed transversely of the plate in a similar fashion to the manner of indicating the degrees on the face of a thermometer, and said scale is divided into five equal sections by transverse lines or registering marks 13 which are somewhat longer than the other lines of the scale. Through the plate 11, and adjacent to the top line and the lowest line of the scale 12 are openings 14 and 15, and through said openings is guided a flexible element or endless cord 16. The endless cord 16 may be of two contrasting colors 17 and 18 such as purple and white, red and white, green and white, or other combination tints whereby the juncture of the colors are adapted to serve as an indicator 18 when the cord is adjusted upon the plate 11 to register with one of the registering marks 13. As shown in the drawing, each of the registering marks 13 is designated by a phrase or word, such as "Hot air", "Blarney", "Shovel", "Stable talk", "Bull", or other witticisms. When a person is making statements which are apparently exaggerated one or more of his hearers may then display the toy or device 10 and by adjusting the endless cord so that the indicator 18 will register with one of the marks 13 the phase of the prevailing opinion as to the absurdity of the remarks will thereby be indicated on the scale 12, and a great deal of amusement will be afforded in consequence.

In the foregoing description I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope thereof.

Having thus described my invention, I claim as new and desire to secure by Letters Patent:—

1. A toy of the character described, comprising a plate, a plurality of spaced registering marks provided upon said plate, each of said marks being designated by a phrase or a word indicative of a witticism, and an indicator adapted to be adjusted upon the plate so as to register with one of the marks whereby one of the witticisms may be designated.

2. A toy of the character described, comprising an elongated plate having an opening in proximity to each of its ends, a plurality of spaced registering marks provided upon one face of the plate, each of said marks being designated by a phrase or a word indicative of a witticism, and a flexible element movably guided in the openings of the plate, and an indicator provided upon the flexible element and adapted to be registered with one of the marks when the flexible element is adjusted whereby one of the witticisms may be designated.

3. A toy of the character described, comprising an elongated plate having an opening in proximity to each of its ends, a scale provided upon one face of the plate and divided into a plurality of sections by a number of registering marks, each of which are designated by a phrase or a word indicative of a witticism, a flexible element movably guided in the openings of the plate, and an indicator provided upon the flexible element and adapted to be registered with one of the marks when the flexible element is adjusted whereby one of the witticisms may be designated.

4. A toy of the character described, comprising an elongated plate having an opening in proximity to each of its ends, a scale composed of a plurality of parallel spaced lines arranged transversely of the plate, said scale being divided into a plurality of sections by a number of registering marks each of which are designated by a phrase or a word indicative of a witticism, and an endless cord movably guided in the openings of the plate, said cord being of two contrasting colors whereby an indicator is provided at the juncture of the colors so as to be registered with one of the marks when the endless cord is adjusted for designating one of the witticisms.

This specification signed and witnessed this sixth day of May A. D. 1912.

JOSEPH H. SLATER.

Witnesses:
ROBT. B. ABBOTT,
M. DERMODY.

Copies of this patent may be obtained for five cents each, by addressing the "Commissioner of Patents, Washington, D. C."